US008185885B2

(12) United States Patent
Clement et al.

(10) Patent No.: US 8,185,885 B2
(45) Date of Patent: May 22, 2012

(54) PROVIDING RECOVERY DATA FOR PROGRAM CODE

(75) Inventors: Andrew Simon Clement, Vancouver (CA); Andrew John Huff, Amersham (GB); Gordon Douglas Hutchison, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 1153 days.

(21) Appl. No.: 11/969,631

(22) Filed: Jan. 4, 2008

(65) Prior Publication Data

US 2008/0168306 A1  Jul. 10, 2008

(51) Int. Cl.
*G06F 9/44* (2006.01)
(52) U.S. Cl. ......................... 717/170; 717/122
(58) Field of Classification Search .......... 717/114–123, 717/168–170
See application file for complete search history.

(56) References Cited

U.S. PATENT DOCUMENTS 6,757,699 B2 * 6/2004 Lowry ................................... 1/1

FOREIGN PATENT DOCUMENTS

EP  1406167 A1  7/2004

OTHER PUBLICATIONS

Khurshid et al., "Repairing Structurally Complex Data", 2005, 12th International SPIN Workshop on Model Checking of Software, 15 pages.*
Ronnau et al., "Towards XML Version Control of Office Documents", Nov. 2005, pp. 10-19, ACM, United Kingdom.
"Version Management with Concurrent Versions System for CVS 1.10", 1993, pp. 1-6, Signum Support AB. http://www.surriel.com/cvs_manual/cvs_1.html.

* cited by examiner

*Primary Examiner* — Ted T Vo
(74) *Attorney, Agent, or Firm* — Yee & Associates, P.C.; David A. Mims, Jr.

(57) ABSTRACT

A method, apparatus and computer program product for providing recovery data for program code. A first version of an object code module is received. A second version of the object code module is received, the second version being a subsequent version to the first version. A unique identifier is inserted in the second version, wherein the unique identifier indicates a location of recovery data. First difference data representing a difference between the second version and the first version is calculated. The first difference data is stored as the recovery data. The first difference data is stored within the second version of the object code module at the location. The unique identifier indicates a location of the recovery data.

14 Claims, 3 Drawing Sheets

PROVIDING RECOVERY DATA FOR PROGRAM CODE

BACKGROUND OF THE INVENTION

1. Field of the Invention

The present invention relates to a method, apparatus and software for providing recovery data for program code.

2. Description of the Related Art

Programs for computers or other programmable devices are normally updated or modified during their life cycle. Many programs are written in source code, which is then compiled into object code. When a program is being updated, it is often important for the system or engineer updating the program to be aware of the current version of the program and whether or not it has been previously modified. Modifications are commonly made to the source code prior to its compilation. Source code version control systems can be used to keep track of such changes.

Software tools exist also for modifying the compiled object code prior to its execution, for example, to introduce optimizations. However, such modifications may depend on the object code being in a known form or version. If modifications have already been made to a known form of the code, subsequent modifications may result in faults or inconsistencies being introduced.

SUMMARY OF THE INVENTION

An illustrative embodiment provides a method for providing recovery data for program code, the method comprising the steps of:
 a) receiving a first version of an object code module;
 b) receiving a second version of the object code module, the second version being a subsequent version to the first version;
 c) calculating first difference data representing the difference between the second version and the first version;
 d) storing the first difference data as recovery data within the second version of the object code module;
 e) prior to calculating the first difference data, inserting a unique identifier in the second version indicating a location for the storing of the recovery data; and
 f) inserting the first difference data at the location indicated by the unique identifier so as to provide the recovery data, wherein said unique identifier is retained so that the unique identifier indicates a location of said recovery data.

The first version may be loaded from a serialized form into memory and then modified to produce the second version, the unique identifier may be inserted in the second version while the second version is loaded, the first difference data may be calculated from the serialized form of the first and second versions and inserted into the serialized form of the second version.

A third version of the object code module may be received, the third version being a subsequent version to the second version, and second difference data may be calculated between the third and second versions and appended to the recovery data. The second difference data may be appended to the recovery data at a position between the first difference data and the unique identifier. The recovery data may be stored in an attribute in the object code module. When the difference data is stored, the length of the attribute may be adjusted accordingly to ensure the attribute is properly formed. The object code may be bytecode. An object code module may be a Java™ class object code module.

Another illustrative embodiment provides a method of recovering a prior version of an object code module, the module comprising recovery data provided according to an embodiment described above, the method comprising the steps of:
 a) identifying the unique identifier in a version of an object code module;
 b) extracting the difference data positioned nearest the unique identifier; and
 c) applying the difference data to the version to retrieve the prior version of the object code module.

A further embodiment provides an apparatus for providing recovery data for program code, the apparatus being operable to:
 receive a first version of an object code module;
 receive a second version of the object code module, the second version being a subsequent version to the first version;
 calculate first difference data representing the difference between the second version and the first version;
 store the first difference data as recovery data within the second version of the object code module;
 prior to calculating said first difference data, insert a unique identifier in said second version indicating a location for said storing of said recovery data; and
 insert said first difference data at said location indicated by said unique identifier so as to provide said recovery data, wherein said unique identifier is retained so that the unique identifier indicates a location of said recovery data.

Another embodiment provides a set of computer instructions arranged to enable a set of one or more programmable devices to carry out a method for providing recovery data for program code, the method comprising the steps of:
 a) receiving a first version of an object code module;
 b) receiving a second version of the object code module, the second version being a subsequent version to the first version;
 c) calculating first difference data representing the difference between the second version and the first version;
 d) storing the first difference data as recovery data within the second version of the object code module;
 e) prior to calculating the first difference data, inserting a unique identifier in the second version indicating a location for the storing of the recovery data; and
 f) inserting the first difference data at the location indicated by the unique identifier so as to provide the recovery data, wherein said unique identifier is retained so that the unique identifier indicates a location of said recovery data.

A further embodiment provides a set of computer instructions arranged to enable a set of one or more programmable devices to provide apparatus for providing recovery data for program code, the apparatus being operable to:
 receive a first version of an object code module;
 receive a second version of the object code module, the second version being a subsequent version to the first version;
 calculate first difference data representing the difference between the second version and the first version;
 store the first difference data as recovery data within the second version of the object code module;
 prior to calculating said first difference data, insert a unique identifier in said second version indicating a location for said storing of said recovery data; and
 insert said first difference data at said location indicated by said unique identifier so as to provide said recovery data, wherein said unique identifier is retained so that the unique identifier indicates a location of said recovery data.

Another illustrative embodiment provides for a computer-implemented method for providing recovery data for program code. A first version of an object code module is received. A second version of the object code module is received, the second version being a subsequent version to the first version. A unique identifier is inserted in the second version. The unique identifier indicates a location of recovery data that is subsequently generated. First difference data is calculated, the first difference data representing a difference between the second version and the first version. The first difference data is stored as the recovery data. The first difference data is stored within the second version of the object code module at the location. The unique identifier is retained so that the unique identifier indicates a location of the recovery data.

Another illustrative embodiment provides for identifying the unique identifier in a second subsequent version of an object code module. In this case, the difference data positioned nearest the unique identifier is extracted. The difference data is applied to the second subsequent version to retrieve the first version of the object code module.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
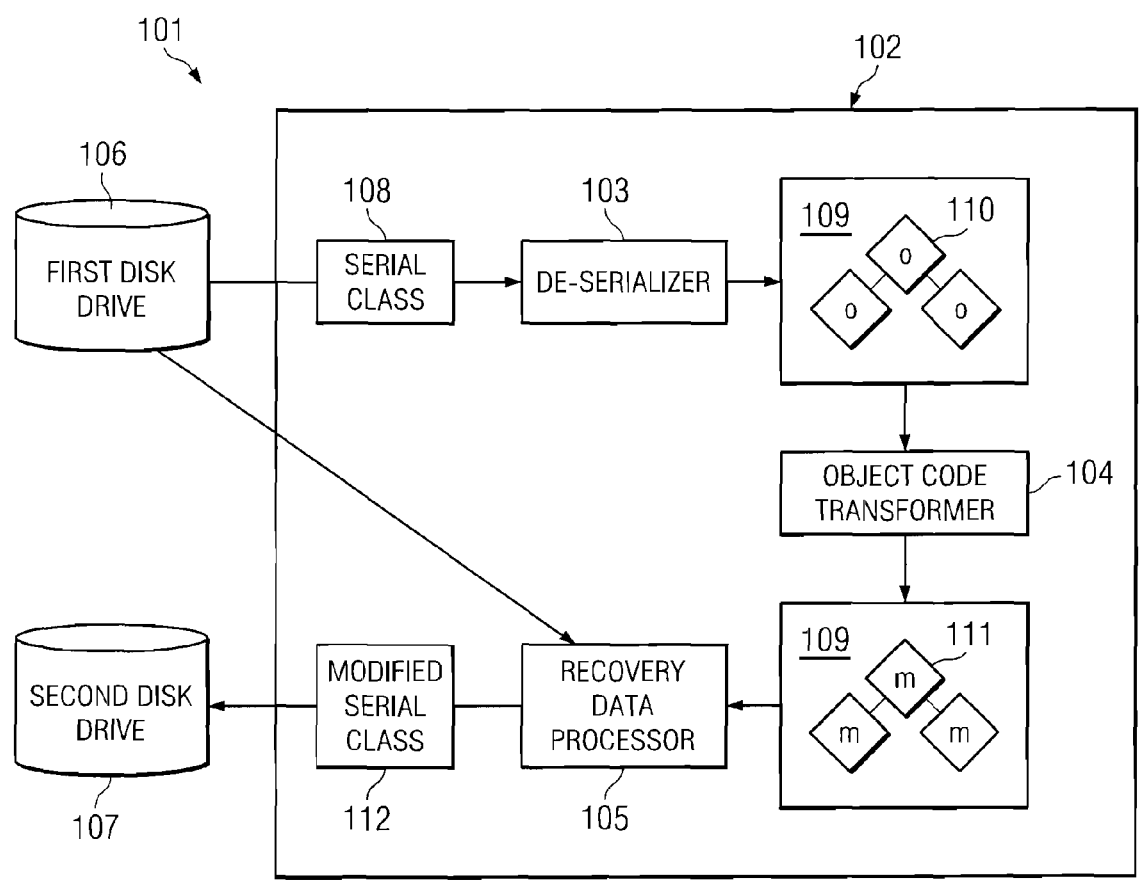
FIG. 1 is a schematic illustration of a computer system arranged to load and modify program code and to provide recovery data for the program code.

With reference to FIG. 1, computer system 101 runs software development tool 102 comprising de-serializer 103, object code transformer 104 and recovery data processor 105. Computer system 101 further comprises first disk drive 106 and second disk drive 107. First disk drive 106 is used to store object code modules for a computer program in the form of Java™ classes. The Java™ classes are stored on first disk drive 106 and second disk drive 107 in serial form as bytecode, capable of running on a Java™ virtual machine (JVM). Software development tool 102 is arranged to process the bytecode of the object code modules stored on first disk drive 106. The processing of the modules involves modifying the bytecode of the modules. The modified modules are stored on second disk drive 107.

De-serializer 103 is arranged to load serial class 108 into memory 109 in object graph form 110. A serial class is a class to be modified from its serial form. Object graph form 110 is then processed by object code transformer 104, which modifies the class and produces modified form 111 in memory 109. Modified form 111 is an object graph. Modified form 111 is then passed to recovery data processor 105, which serializes the class for storage and records any changes made to the class.

The changes are determined from a comparison of the original serialized form of the class, that is serial class 108, and the modified serialized form of the class, that is modified serial class 112. The changes are stored as recovery data associated with modified serial class 112 on second disk drive 107. This recovery data is arranged to be applied to the modified serial class 112 to retrieve or recover serial class 108, which is the original class.

Figure 2:
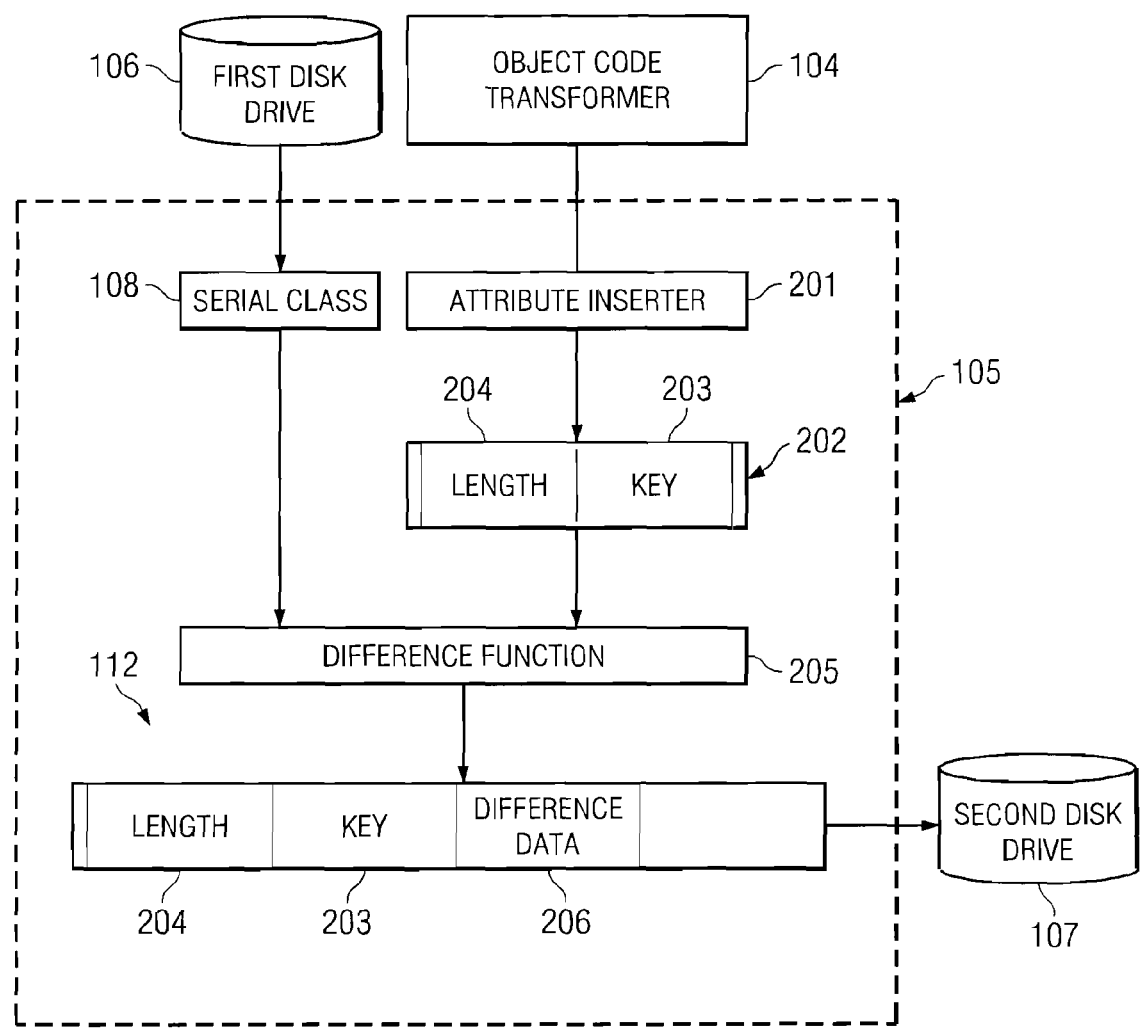
FIG. 2 is a schematic illustration of a recovery data processor in the computer system of FIG. 1.

Recovery data processor 105 is shown in further detail in FIG. 2. Recovery data processor 105 is arranged to take the output from object code transformer 104 in the form of the object graph of modified form 111. Attribute inserter 201 is arranged to insert a new attribute within the modified form 111 in the form of a recovery data attribute. The recovery data attribute is arranged to hold the recovery data for the modified form 111.

Initially, the recovery data attribute holds a unique 16-byte sequence that provides a unique identifier or key. The identifier is unique in the sense that the identifier is sufficiently well defined as to be highly unlikely to occur naturally in the bytecode outside the recovery data attribute. The unique 16-byte sequence is stored in a constant in object code transformer 104. While the key is inserted in modified form 111 of the class, the key is also arranged to be identifiable within modified serial class 112.

Once the recovery data attribute has been inserted, the class is re-serialized into bytecode 202, which includes a unique identifier in the form of key 203. The class is preceded by an indication of length 204 of the recovery data, as a whole, in order to ensure that the recovery data attribute is properly formed. In this way, the unique identifier of key 203 is retained in the re-serialized bytecode 202, and so is a retained unique identifier.

Recovery data processor 105 further comprises difference function 205 arranged to determine the binary difference between the bytecode of serial class 108 and the bytecode 202 of the class, including the recovery data attribute. Difference function 205 applies a binary difference algorithm to the bytecode files to produce difference data 206 representing any identified differences. Difference data 206 is inserted in the recovery attribute in the bytecode 202 of the modified serialized form of the class. The position for insertion of difference data 206 is indicated by the unique identifier in the form of key 203.

Thus modified serial class 112 is produced, which contains recovery data in the form of a binary difference that can be used to revert from modified serial class 112 to the original serial class 108. Attribute inserter 201 is arranged to identify an incoming modified class that already contains a recovery data attribute and serializes such classes without adding a further attribute.

In this case, difference function 205 is arranged to add the further difference data it produces between the unique identifier and any existing difference data. In other words, the new difference data is inserted after the unique identifier in the bytecode of the class. This operation results in a string of difference data and field length pairs, which provides recovery data that enables each subsequent version to be recovered. Thus, the recovery data attribute will have the following form, which meets the defined specification of a well-formed java class file attribute:

```
recovery_data_attribute {
    u2 attribute_name_index;
    u4 attribute_length;
    u1 unique_key[16];
    {
```

```
        u4 difference_data_length;
        u1 difference_data[difference_data_length];
    }
}
```

Figure 3:
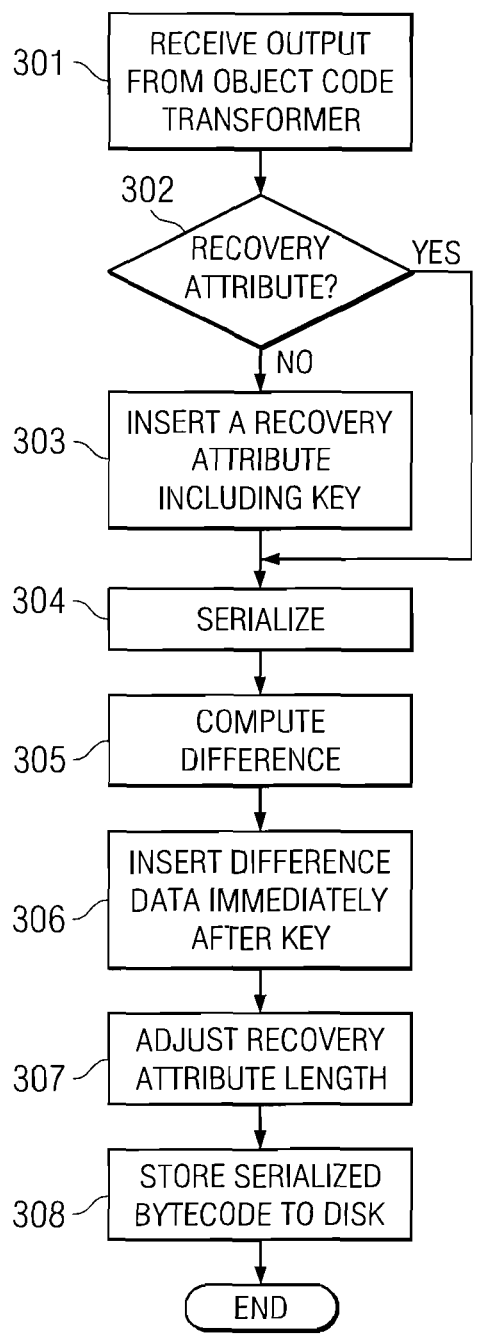
FIG. 3 is a flow chart illustrating processing carried out by the recovery data processor of FIG. 2 when creating recovery data.

The processing carried out by recovery data processor 105 when creating recovery data will now be described further with reference to the flow chart of FIG. 3. At step 301, the process is initiated when output in the form of a modified class is received from the object code transformer. Processing then moves to step merchant 302, where the object graph of the class is inspected to determine if a recovery data attribute is present. If not, processing moves to step 303, where a new recovery data attribute is inserted into the class, which includes a unique identifier in the form of a key. Processing then moves to payment processor, step 304, where the object graph form of the class including the new recovery data attribute is serialized. If, at step 302, an existing recovery data attribute is identified, processing moves to step 304.

At step 305, the binary difference data is calculated between the bytecode forms of the modified and original classes. At step 306, the first occurrence of the unique identifier is located within the bytecode of the modified class, and the difference data is inserted immediately after the key in the bytecode sequence. The key is retained in the bytecode sequence to provide subsequent efficient identification of the location of recovery data. Finding the first occurrence is important because further occurrences may exist in one or more previously inserted sets of difference data.

Processing then moves to step 307, where the length of the recovery data attribute is adjusted to take into account the newly added difference data, and thus ensure that the attribute is properly formed. Processing then moves to step 308, in which the bytecode is stored. The process terminates thereafter.

Figure 4:
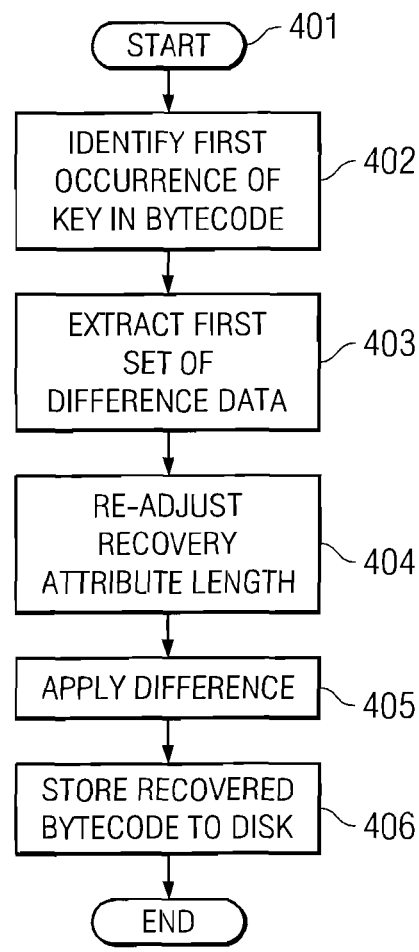
FIG. 4 is a flow chart illustrating the process of recovering a prior version of program code using the recovery data.

The processing carried out to recover a prior version of a class using the recovery data will now be described further with reference to the flow chart of FIG. 4. At step 401, the recovery process is initiated by a user. At step 402, the first occurrence of the unique identifier, or key, is located in the bytecode for the class. Other occurrences of the unique identifier, or key, may be present in the difference data, but these occurrences will be positioned after the first occurrence of the unique identifier that indicates the start of the difference data in the recovery data attribute. In this way, the unique identifier provides for efficient identification of a location of recovery data, without parsing of the bytecode.

Processing then moves to step 403, where the first set of difference data is extracted from the recovery data attribute. At step 404, the length of the recovery attribute is re-adjusted to account for the extracted difference data. At step 405, the difference data is applied to the bytecode for the class, so as to recover the prior version of the bytecode. Processing then moves to step 406 where the recovered version of the bytecode is stored. The process terminates thereafter.

In another embodiment, the recovery data processor is arranged to provide object code for immediate processing by a processor or virtual machine. In a further embodiment, the unique identifier is used to indicate the end of the recovery data attribute and subsequent difference data is appended at that point.

In a further embodiment, the recovery data attribute is removed prior to the difference algorithm being applied so as to exclude the recovery data attribute from the new difference data. Once the new difference data has been calculated, the recovery data attribute is reinserted in the bytecode and the newly calculated difference data inserted within the bytecode at the point indicated by the unique identifier. In this manner, the size of each set of difference data may be reduced along with the possible number of duplicate occurrences of the unique identifier. In this manner, the possibility of confusion is reduced when searching for the unique identifier, or key, either while inserting or extracting difference data.

In another embodiment, metadata is included in each set of difference data when metadata is stored in the recovery data attribute. The metadata may be is used to identify the particular difference algorithm used to create the difference data or to identify which of a set of predetermined different formats is used for the difference data. The metadata may also identify the software tool responsible for producing the recovery data attribute and its contents, or information on how the difference data should be applied to the bytecode during the recovery of a prior version. For example, the metadata may indicate whether the difference data needs to be applied to the bytecode with this difference data replaced by the unique identifier or whether the difference data should be applied to the bytecode with the recovery attribute data removed. The metadata therefore provides a mechanism to enable difference software tools to process the recovery data attribute appropriately.

In a further embodiment, the object code transformer is arranged to apply aspects to the object code. The object code transformer may be provided by an Aspect Orientated Software Development Tool.

Many different difference algorithms are available that may be used to provide the difference data referred to above. In some cases, the original bytecode itself may be used as the difference data, which reduces the processing required to calculate the data but may result in a large file size for the object code when compared to other algorithms. Furthermore, the unique identifier may be any suitable length or code combination sufficient to provide a well defined marker within the bytecode.

The techniques described herein may be applied to any form of compiled code that obeys a predetermined specification within its execution environment. For example, the Java™ Virtual Machine (JVM) class specification defines the file format required for a Java™ class to be loaded and executed by a JVM. The above techniques may also be applied to the Microsoft™ Intermediate Language (MSIL) object code produced by the Common Language Runtime compilers from Microsoft™ that compile languages such as C#, J#, and VisualBasic.NET™. Specifications for other object code formats used for natively compiled applications, such as the ELF™ format for executables that runs in Intel™ 32-bit processing environments, may also take advantage of the above techniques. Any such specification needs to specify a way to harmlessly embed data, in the form of the recovery data, which will be ignored by all but the intended consumer.

The illustrative embodiments provide data to recover an original, or prior, version of a code, with the recovery data being held inside the existing code file. Thus the recovery data is kept with the file to which it relates, regardless of the movements of that file. Because the recovery data is contained within a known data structure within the file, the file structure remains correct and valid. The size of the recovery data may be minimized. Additionally, calculating and storing the difference data requires relatively few computing resources.

It will be understood by those skilled in the art that the apparatus that embodies a part or all of the illustrative embodiments may be a general purpose device having software arranged to provide a part or all of an illustrative embodiment. The device may be single device or a group of devices and the software may be a single program or a set of programs comprising computer instructions. Furthermore, any or all of the computer instructions used to implement the illustrative embodiments can be communicated via any suitable transmission or storage means so that the software can be loaded onto one or more devices.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for providing recovery data for program code, the computer-implemented method comprising:
receiving a first version of an object code module;
receiving a second version of the object code module, the second version being a subsequent version to the first version;
inserting a unique identifier in the second version, wherein the unique identifier indicates a location of recovery data;
calculating first difference data representing a difference between the second version and the first version;
storing the first difference data as the recovery data, wherein the first difference data is stored within the second version of the object code module at the location, and wherein the unique identifier indicates a location of the recovery data;
wherein the first version is loaded from a serialized form into memory and then modified to produce the second version, wherein the unique identifier is inserted in the second version while the second version is loaded, wherein the first difference data is calculated from a serialized form of the first and second versions, and wherein the first difference data is inserted into the serialized form of the second version;
receiving a third version of the object code module, wherein the third version is a second subsequent version to the second version;
calculating second difference data between the third version and second version; and
appending the second difference to the recovery data.

2. The method of claim 1, wherein the second difference data is appended to the recovery data at a position between the first difference data and the unique identifier.

3. The method of claim 2, wherein the recovery data is stored in an attribute in the third object code module.

4. The method of claim 3, wherein, when the difference data is stored, the length of the attribute is adjusted to ensure the attribute is properly formed.

5. The method of claim 3, wherein the object code is bytecode.

6. The method of claim 3, wherein the object code module is a Java™ class.

7. A data processing system comprising:
a bus;
a memory connected to the bus, wherein the memory contains a set of instructions;
a processor connected to the bus, wherein the processor is operable to execute the set of instructions to:
receive a first version of an object code module;
receive a second version of the object code module, the second version being a subsequent version to the first version;
insert a unique identifier in the second version, wherein the unique identifier indicates a location of recovery data;
calculate first difference data representing a difference between the second version and the first version;
store the first difference data as the recovery data, wherein the first difference data is stored within the second version of the object code module at the location, and wherein the unique identifier indicates a location of the recovery data;
wherein processor executes the instructions such that the first version is loaded from a serialized form into memory and then modified to produce the second version, the unique identifier is inserted in the second version while the second version is loaded, the first difference data is calculated from a serialized form of the first and second versions, and the first difference data is inserted into the serialized form of the second version;

receive a third version of the object code module, wherein the third version is a second subsequent version to the second version;

calculate second difference data between the third version and second version; and append the second difference to the recovery data.

8. The data processing system of claim 7, wherein the processor executes the instructions such that the second difference data is appended to the recovery data at a position between the first difference data and the unique identifier.

9. The data processing system of claim 8, wherein the processor executes the instructions such that the recovery data is stored in an attribute in the third object code module.

10. The data processing system of claim 9, wherein the processor executes the instructions such that, when the difference data is stored, the length of the attribute is adjusted to ensure the attribute is properly formed.

11. The data processing system of claim 9, wherein the object code is bytecode.

12. The data processing system of claim 9, wherein the object code module is a Java™ class.

13. A non-transitory computer-readable storage medium including a computer program product for providing recovery data for program code, the computer program product comprising:

computer instructions for receiving a first version of an object code module;

computer instructions for receiving a second version of the object code module, the second version being a subsequent version to the first version;

computer instructions for inserting a unique identifier in the second version, wherein the unique identifier indicates a location of recovery data;

computer instructions for calculating first difference data representing a difference between the second version and the first version;

computer instructions for storing the first difference data as the recovery data, wherein the first difference data is stored within the second version of the object code module at the location, and wherein the unique identifier indicates a location of the recovery data;

wherein the computer instructions require that the first version is loaded from a serialized form into memory and then modified to produce the second version, the unique identifier is inserted in the second version while the second version is loaded, the first difference data is calculated from a serialized form of the first and second versions, and the first difference data is inserted into the serialized form of the second version;

computer instructions for receiving a third version of the object code module, wherein the third version is a second subsequent version to the second version;

computer instructions for calculating second difference data between the third version and second version; and computer instructions for appending the second difference to the recovery data.

14. The non-transitory computer-readable storage medium of claim 13, wherein the computer program product further comprises:

computer instructions for identifying the unique identifier in a second subsequent version of an object code module;

computer instructions for extracting the difference data positioned nearest the unique identifier; and computer instructions for applying the difference data to the second subsequent version to retrieve the first version of the object code module.

* * * * *